United States Patent
Brueckheimer et al.

(10) Patent No.: US 8,249,075 B2
(45) Date of Patent: *Aug. 21, 2012

(54) ATM COMMUNICATIONS SYSTEM AND METHOD

(75) Inventors: Simon Daniel Brueckheimer, London (GB); David John Stacey, Newbury (GB)

(73) Assignee: Ericsson AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/268,243

(22) Filed: Nov. 10, 2008

(65) Prior Publication Data

US 2009/0067434 A1    Mar. 12, 2009

Related U.S. Application Data

(63) Continuation of application No. 10/803,215, filed on Mar. 18, 2004, now Pat. No. 7,463,636, which is a continuation of application No. 09/242,500, filed as application No. PCT/GB97/02880 on Oct. 17, 1997, now Pat. No. 6,731,635.

(30) Foreign Application Priority Data

Oct. 18, 1996    (GB) ...................................... 9621776

(51) Int. Cl.
    H04L 12/28    (2006.01)
(52) U.S. Cl. ............ 370/395.1; 370/395.61; 370/395.64
(58) Field of Classification Search .................. 370/328, 370/395.1, 395.61, 395.64, 474
See application file for complete search history.

(56) References Cited

U.S. PATENT DOCUMENTS

| | | | |
|---|---|---|---|
| 5,822,321 A * | 10/1998 | Petersen et al. ............... | 370/474 |
| 6,341,131 B1 * | 1/2002 | Eneroth et al. ........... | 370/395.61 |
| 6,671,289 B1 * | 12/2003 | Tamura et al. ............. | 370/395.1 |
| 7,054,318 B2 * | 5/2006 | Eneroth et al. ............. | 370/395.1 |
| 7,463,636 B2 * | 12/2008 | Brueckheimer et al. . | 370/395.64 |

* cited by examiner

*Primary Examiner* — Robert Wilson
*Assistant Examiner* — Mohamed Kamara
(74) *Attorney, Agent, or Firm* — Potomac Patent Group PLLC

(57) ABSTRACT

Traffic from a number of different service type users is multiplexed into minicells for transmission over an ATM link. Service type information is transmitted in a service specific field and is stored. This stored information is used to derive length information to delineate the different length user minicells. The technique occupies less bandwidth than the conventional methods for transmitting cell length information.

19 Claims, 6 Drawing Sheets

Switching of AAL-CU Packets

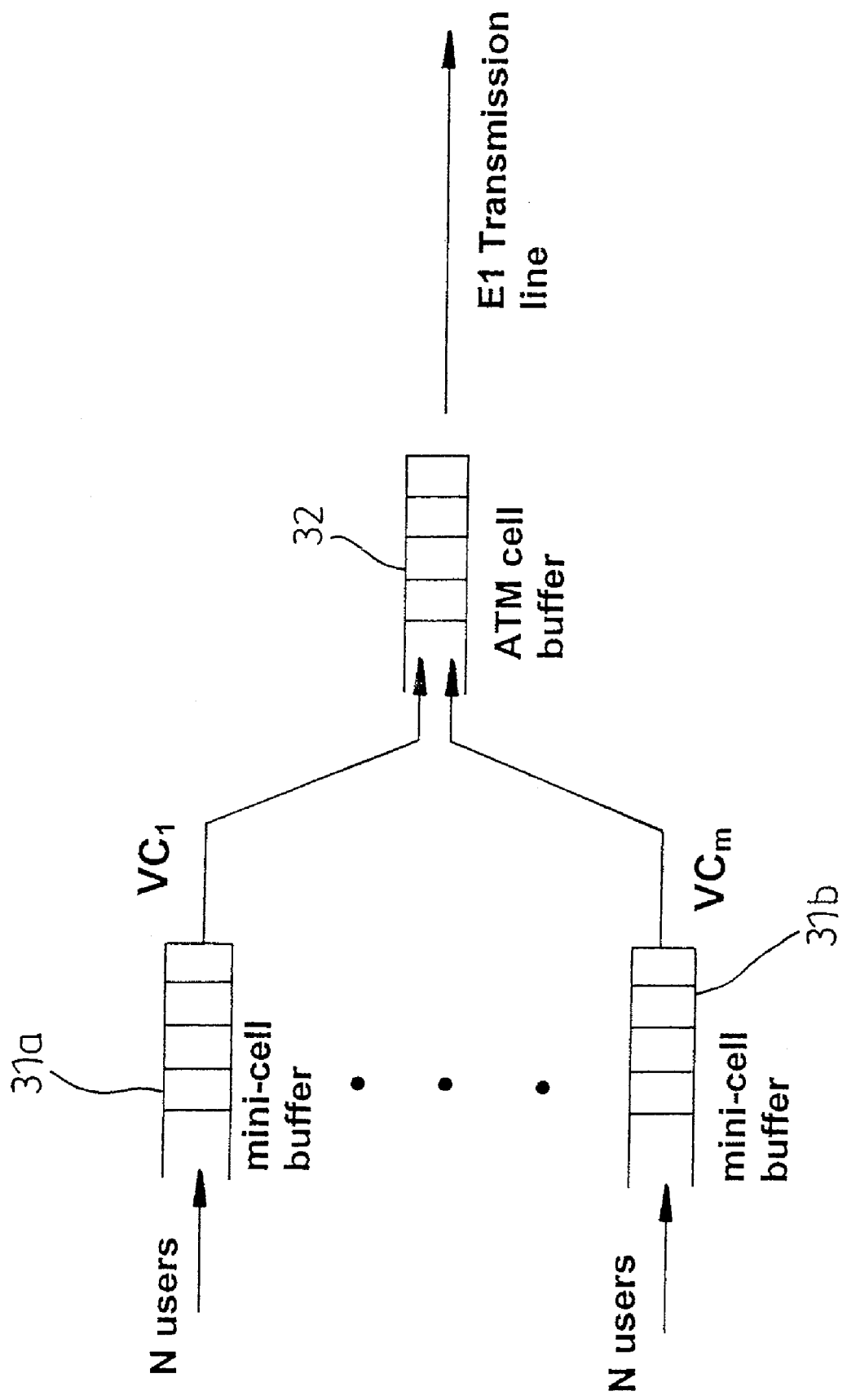

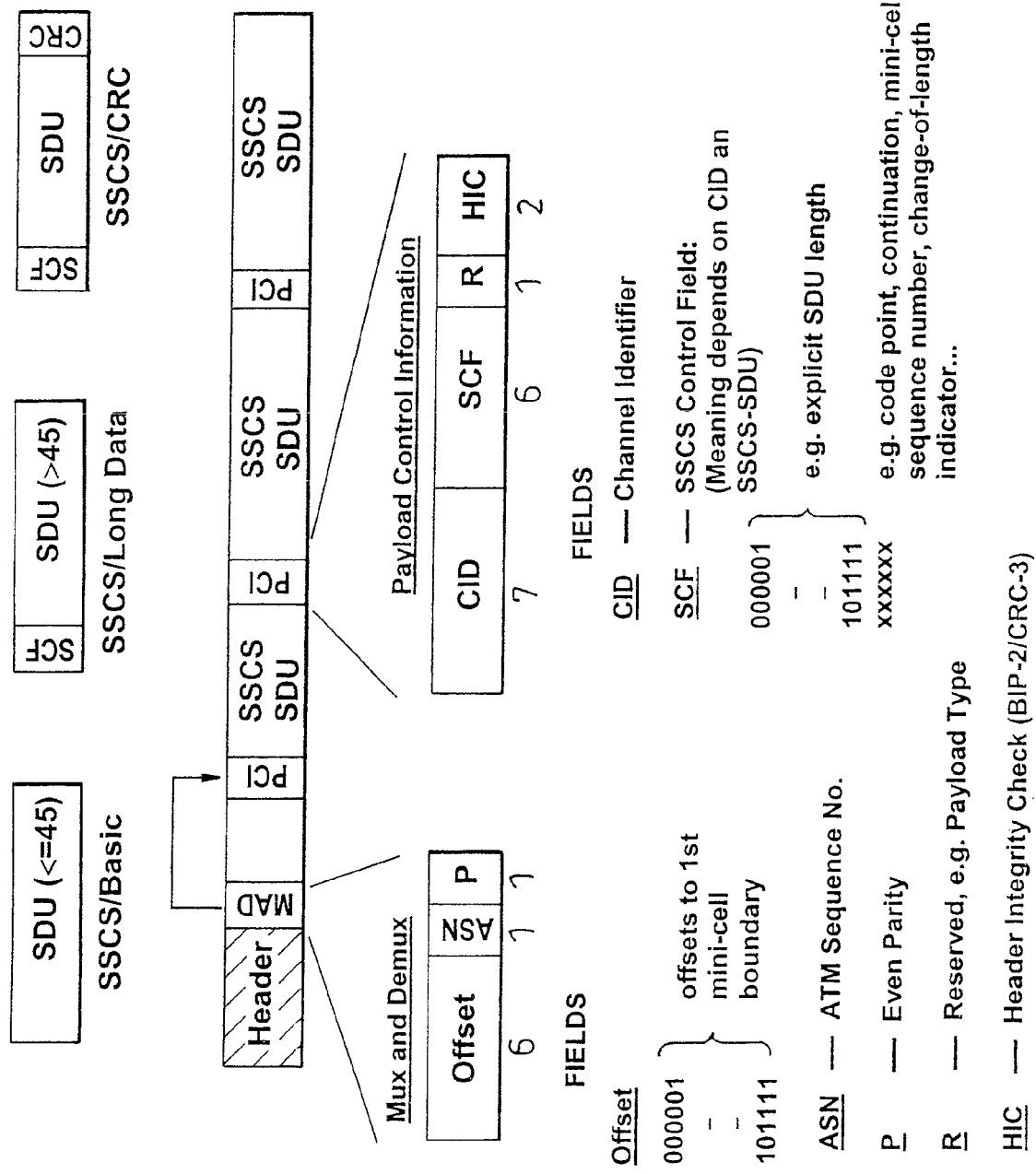

ATM COMMUNICATIONS SYSTEM AND METHOD

RELATED APPLICATION

This application is a continuation of co-pending U.S. application Ser. No. 10/803,215, filed Mar. 18, 2004, which is a continuation of U.S. application Ser. No. 09/242,500, filed Feb. 12, 1999, now U.S. Pat. No. 6,731,635, which is the national filing of International Application No. PCT/GB97/02880, filed Oct. 17, 1997.

This invention relates to digital telecommunications systems and in particular to an arrangement and method for transmitting asynchronous transfer mode (ATM) traffic.

BACKGROUND OF THE INVENTION

A recent development in telecommunications technology has been the introduction of the asynchronous transfer mode (ATM) transmission technique. The asynchronous transfer mode (ATM) technology is a flexible form of transmission which allows various types of service traffic, e.g. voice, video or data, to be multiplexed together on to a common means of transmission, the traffic being carried in cells each having a header indicating its destination. The service traffic is adapted typically into 53 byte cells comprising 0.5 byte headers and 48 byte payloads such that the original traffic can be reconstituted at the far end of the ATM network. This form of adaptation is performed in the ATM adaptation layer (AAL). The technique allows large volumes of traffic to be handled reliably and efficiently.

A description of a cell multiplexing apparatus handling multiple items of information is given by Takashima et al. in specification U.S. Pat. No. 5,509,007. An arrangement for providing ATM call interworking with the PSTN is described by Zsehong et al. in IEEE/ACM Transactions on Networking, vol. 2, No. 1, 1 Feb. 1964, pages 30 to 39. Voice transport on an ATM broadband network is described by Covington et al. in Communications Technology for the 1990's and Beyond, Dallas, Nov. 27-30, 1989, vol. 3 of 3, 27 Nov. 1989, IEEE, pages 1921 to 1925.

Various enhancements of the basic ATM transmission protocol have been proposed to accommodate specific user requirements. One of these enhancements has been the introduction of minicells for low bit rate users to reduce the cell assembly delays previously experienced by such users. In such a system, minicells from a number of users can be multiplexed together and packed into a standard ATM cell for transmission over a common virtual channel. A number of recommendations have been made for an adaptation layer to provide support of these services, but none of these has effectively accommodated the different requirements of the system users.

There are three major types of system user are detailed below.

Error Tolerant Low Bit-Rate

Typically these services are used in mobile wireless applications for carrying traffic via a fixed network between wireless base stations and a mobile switching centre or between two mobile switching centres. Low bit rate coding schemes, usually involving compression, are used to transfer synchronous data (usually voice). The relatively high error rates associated with the air interface in a wireless system generally requires these services to use speech and channel coding algorithms that contain error protection (particularly over vulnerable speech parameter and control fields) and typically use 'forward adaptation' coding In a forward adaptation algorithm, the speech coding process operates entirely within one data packet. It is therefore memory-less, and an error associated with the loss or corruption of a data packet does not extend beyond the boundaries of that packet. Recovery mechanisms exist in the speech decoding process to mitigate the effects of lost or severely corrupted data packets, provided that the fact is signalled to the decoder. In the GSM system for example, the previous "good" packet may substitute for a corrupt packet. The basic requirements for this category are low mini-cell assembly delay together with a high bandwidth efficiency.

Error Intolerant Low Bit-Rate

Low bit rate (usually involving compression) coding schemes are used to transfer synchronous data (usually voice). Typically these services are used in wire-line applications, and are expected to provide a high quality service over relatively low error-rate physical links. The speech coding algorithms employed do not contain significant error protection generally, and are often 'backward adaptation' algorithms.

In a backward adaptation algorithm the speech coding process runs over a number of samples such that information decoded in one sample directly influences the decoding of several others. The loss or corruption of a sample can lead to an error occurring over an extended time period due to the memory and adaptation time constants contained within the coding process.

Backward adaptation coders tolerate isolated bit or sample errors—for example in ADPCM a click and noise distortion may be audible—but they have no intrinsic mechanism to mitigate the effects of long bursts of consecutive sample errors caused by loss or corruption of a AAL-CU mini-cell. There are two options available for supporting these legacy services. The first option is the reduction of the end-to-end error rate by using forward error correction and interleaving data over several packets. This is a solution that is tuned to the transport medium and could support many service types. However, the complexity and increase in end-to-end delay that would result makes it unsuitable for the new AAL. The second option is the creation of a service specific error mitigation scheme which, based on reliable error indication scheme in the common part sub-layer, can carry out an appropriate recovery procedure in the convergence sub-layer, or by invoking mechanisms intrinsic to the service. This service category is therefore vulnerable to bit error, mini-cell loss or mis-concatenation/delivery and the ability to detect lost or corrupted mini-cells is a key requirement.

Mobile Packet Data

This is a recently introduced service which carries low bit rate data such as GSM data. The basic requirement for this category is high bandwidth efficiency. The service is delay tolerant and generally does not require any further protection in the AAL layer. However, the length of a data unit may be up to several hundred bytes long and a mechanism is therefore required to enable the data to be segmented. As a consequence, the loss or corruption of a mini-cell would cause the discard of the entire data packet generally. In protocols based on retransmission, a noisy transmission environment could become swamped.

The specific requirements of these different types of system user cannot all be met by current ATM transmission protocols. A particular problem with accommodation of these various users is that of determining the length of each minicell so the cells can be correctly delineated in the de-multiplexing process. The different user services will normally require the use of minicells of different lengths for each user. Further, some users may require variable length minicells. At present length determination or delineation of individual minicells is effected by the use of a length identifier (LI) field which is used to encode the explicit length of the minicell protocol data unit. The provision of this information occupies bandwidth that might otherwise be made available for revenue earning payload use or for the provision of other control functions.

SUMMARY OF THE INVENTION

An object of the invention is to minimise or to overcome this disadvantage.

A further object of the invention is the provision of an ATM adaptation layer to provide system flexibility to support a variety of system users.

According to the invention there is provided a method of transmitting traffic from a plurality of users having respective service types over an ATM virtual circuit connection, the method including storing in a look-up table information for each said user comprising a service type indicator, a circuit identifier and a cell length indicator for that user, segmenting each user's traffic and packaging the segmented user traffic into minicells, multiplexing the minicells from a plurality of users into ATM cells each ATM cell having a header incorporating a connection identifier field, entering in said connection identifier field the respective circuit identifier for each said user, transmitting the ATM cells over the connection, determining from the look-up table for each said user the service type and the length of the minicells associated with that user whereby to effect delineation of the minicells contained in each said ATM cell, and de-multiplexing the delineated minicells whereby to recover each user traffic.

The technique allows a reduction in the amount of control or overhead information that must be transmitted thus freeing bandwidth e.g. to provide additional payload capacity. The minicell length is determined implicitly or explicitly from a service type code that is provided in the cell header.

BRIEF DESCRIPTION OF THE DRAWINGS

An embodiment of the invention will now be described with reference to the accompanying drawings in which:

FIG. 5 illustrates the concatenation of small trunk groups.

FIG. 6 illustrates various fields associated with ATM cells.

DESCRIPTION OF PREFERRED EMBODIMENT

Figure 1:
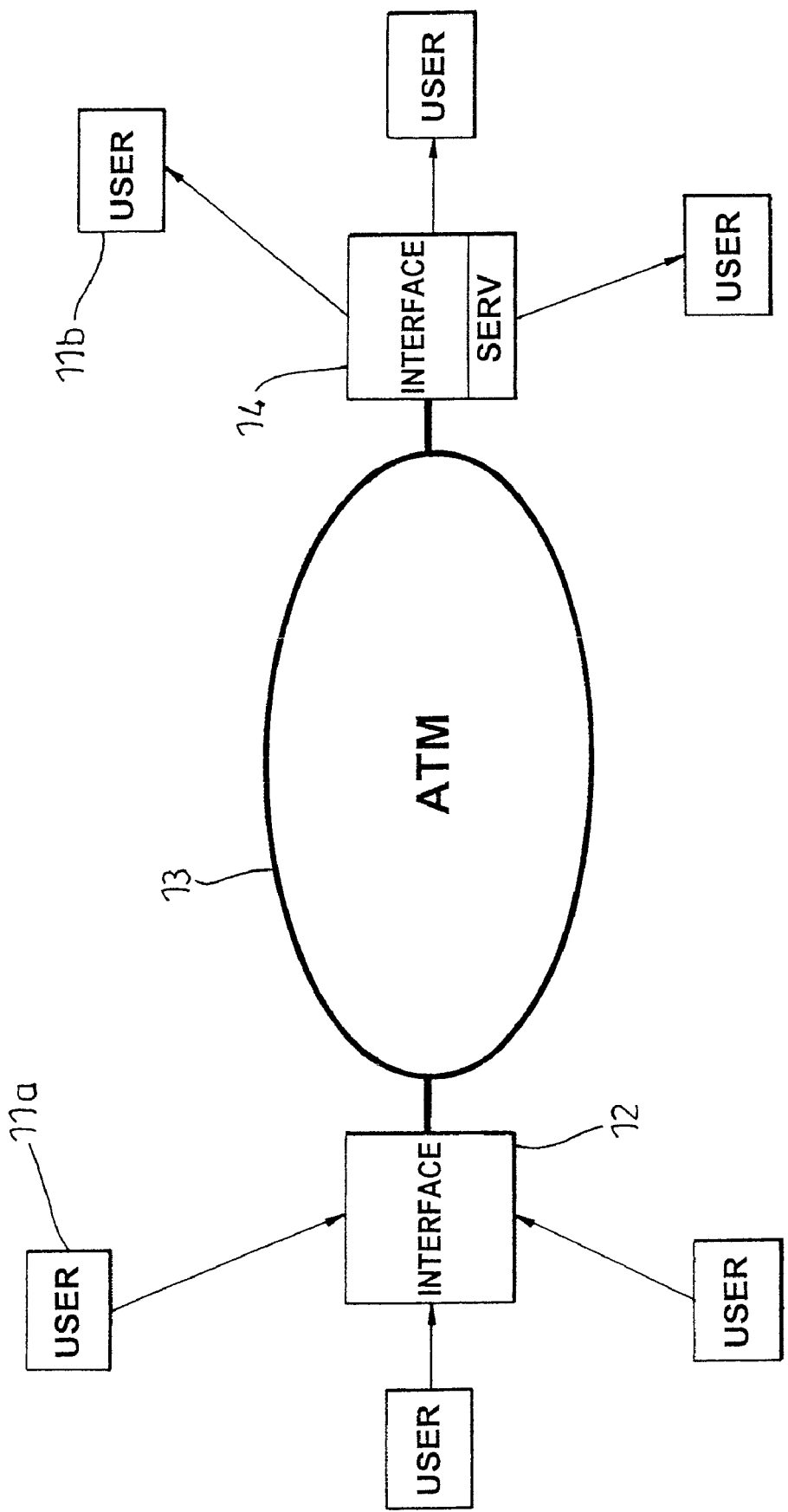
FIG. 1 is a highly schematic diagram illustrating an ATM network providing composite user access.
Figure 2:
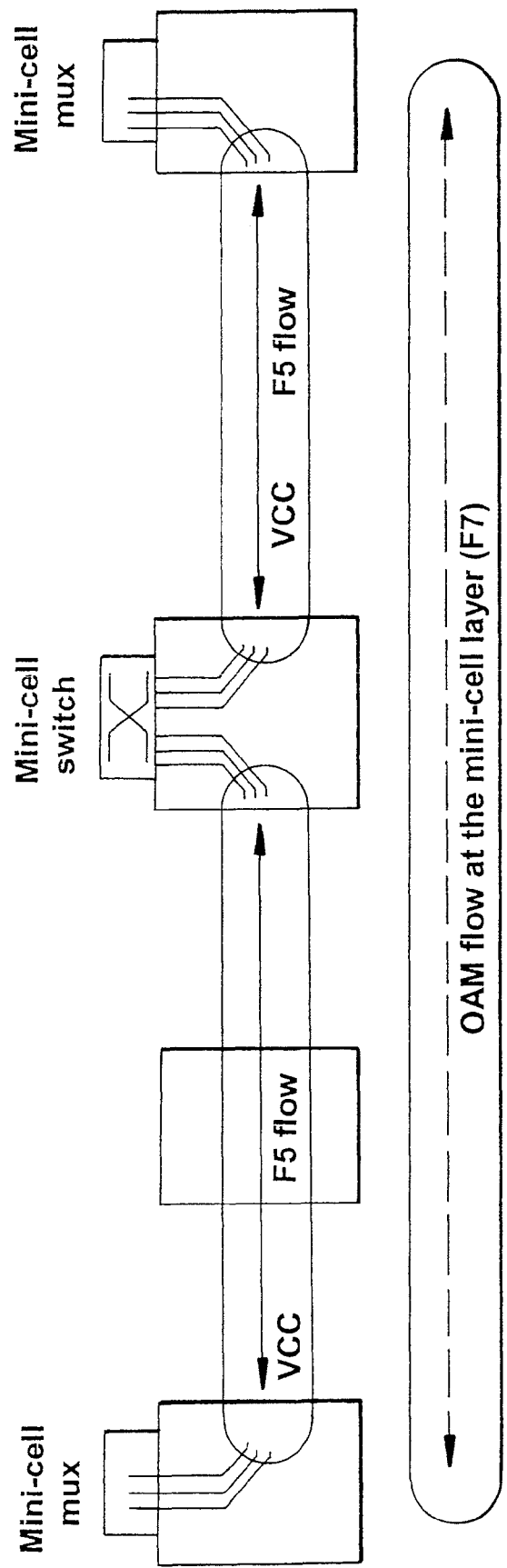
FIG. 2 illustrates the DSDST SCF control fields employed in the network of FIG. 1.
Figure 3:
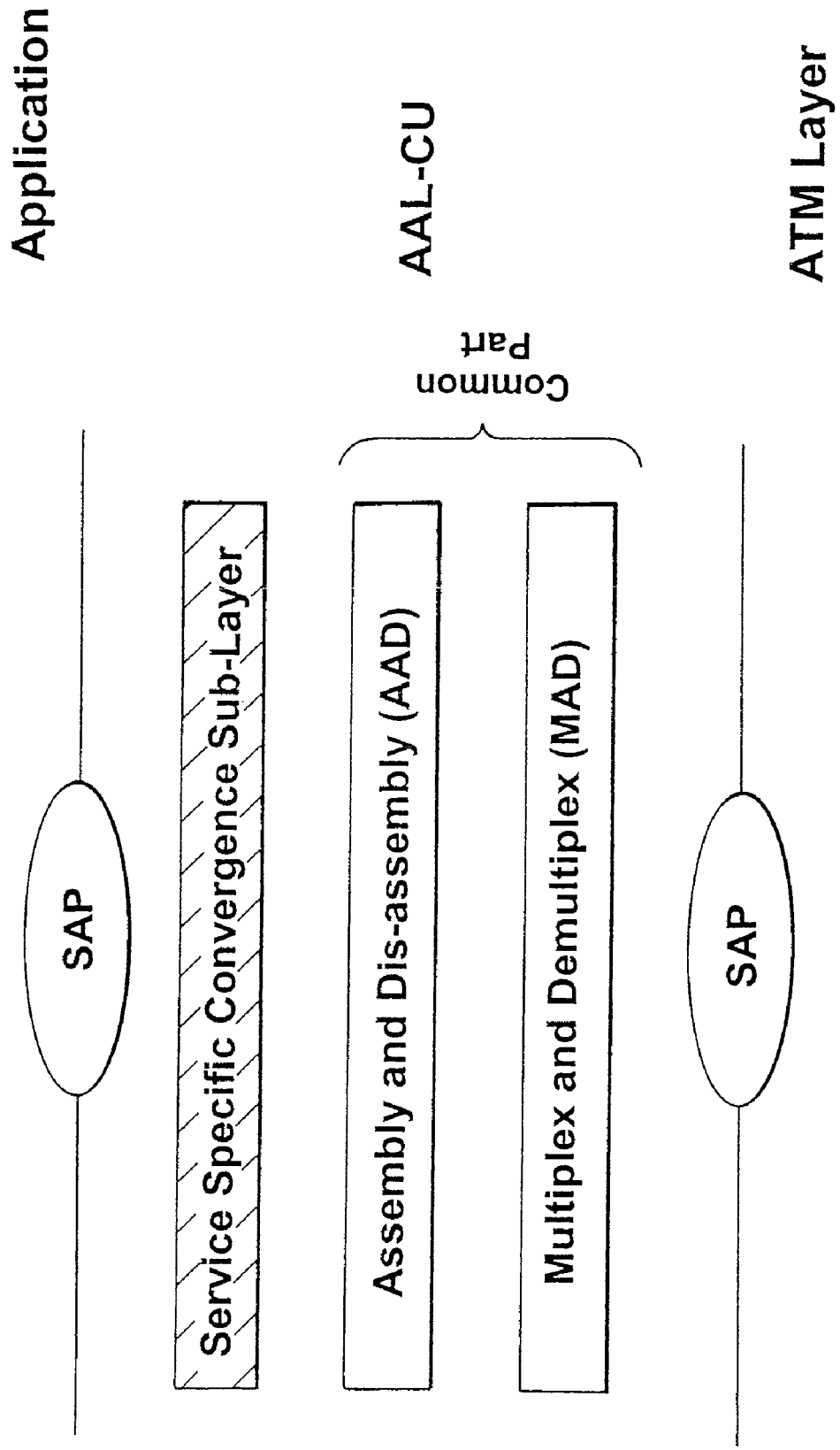
FIG. 3 illustrate the effects of and recovery from cell loss.

Referring first to FIG. 1, traffic from a number of users 11 is routed to an interface 12 where assembly of user minicells and multiplexing of those minicells into ATM cells is performed. The assembled ATM cells are provided with appropriate header information and are transmitted across the ATM network 13 to an egress interface 14 where cell disassembly and de-multiplexing is performed to recover the user traffic. An AAL-CU adaptation layer employed in the network of figure is separated into two parts, a Common Part Sub-layer (CPS) and a Service Specific Convergence Sub-layer (SSCS).

The list of identified requirements for the Common Part Sub-layer includes:
support multiplexing of multiple users into a single connection;
ability to delineate mini-cell boundaries within the ATM payload;
error detection across AAL-CU common part information;
protection against mis-concatenation due to ATM cell loss or mini-cell common part information corruption—to enable support of a free mixture of service categories within the same connection;
preserved order of mini-cell delivery;
bounded ATM cell assembly delay and mini-cell delay variation;
rapid resynchronisation after loss of delineation to minimise error extension;
support for OA&M;
straddling of mini-cells across ATM payload boundaries to achieve high bandwidth utilisation.

The following is a list of functions that may be included within the SSCS, depending on the service category to be supported:
mapping of voice and or data into mini-cell format;
support for fixed length packets up to Y* octets;
support for variable length packets up to Y* octets
support for dynamically changing packet lengths (up to Y* octets)—a dynamically changing mini-cell is defined as one where a change in the mini-cell length may occur only in a controlled manner (through ANP), otherwise it would be variable length;
detection (and possibly) correction of errors within the mini-cell payload or SSCS control information;
segmentation and re-assembly of long data packets;
detection of mini-cell loss—this is required by some services to prevent a permanent end-to-end phase change from occurring due to mini-cell loss/mis-delivery.

Figure 4:
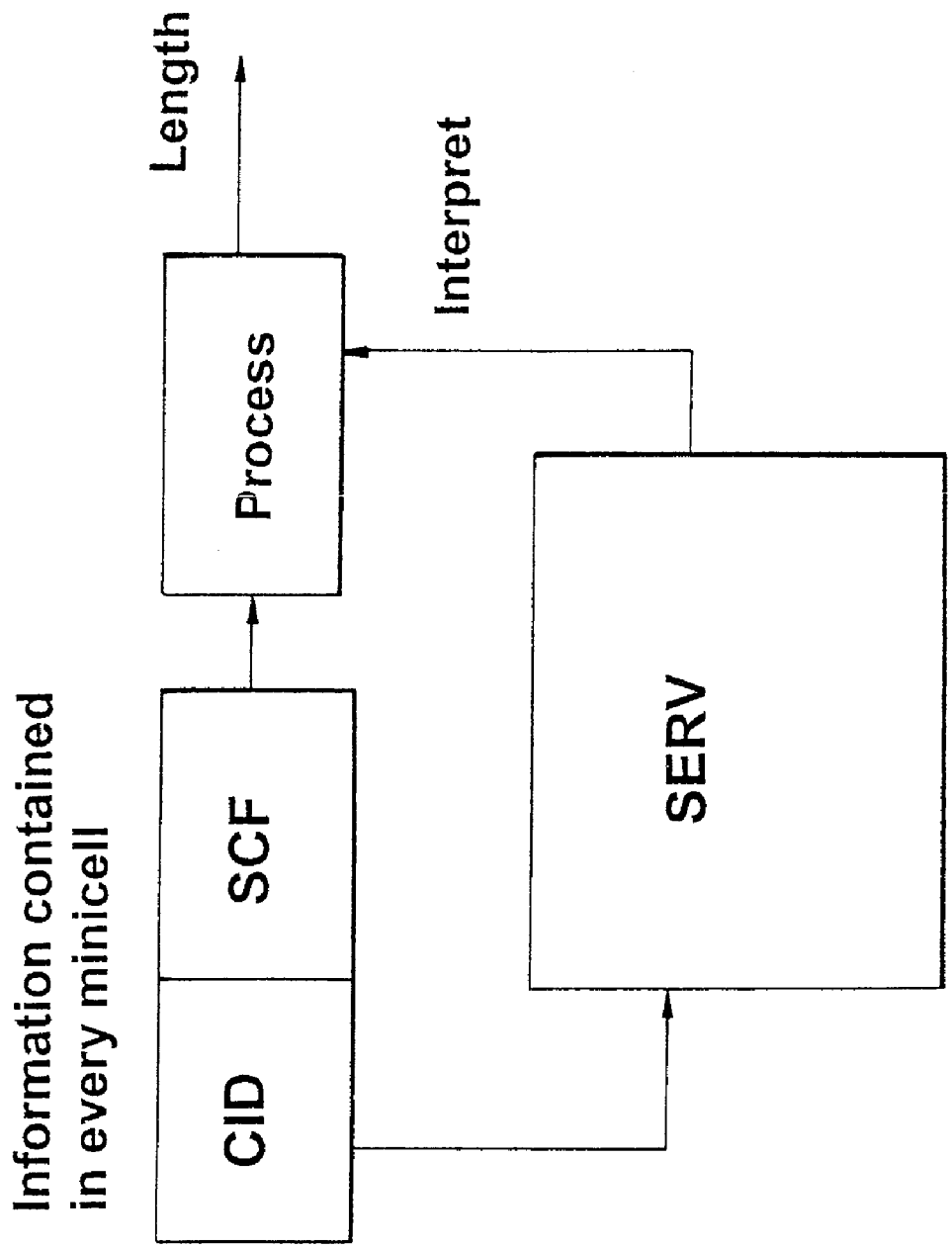
FIG. 4 illustrates the process of cell delineation employed in the network of FIG. 1.

In the arrangement of FIG. 1, delineation of the minicells is provided to determine the start of each minicell and thus ensure effective de-multiplexing of the minicells for each user. The delineation process is illustrated in FIG. 4. Each user has a corresponding circuit identifier entered in the connection identifier field (CID) in the ATM cell header. The purpose of the Connection Identifier (CID) is to identify the individual users within the multiplexed connection. There has been much debate on the length of the CID field. The longer the field, the larger the number of users that may be multiplexed into a single VC connection, and thus in general, the higher the statistical multiplex gain that a link may yield for a given service. However this must be balanced by constraining both the mini-cell delay variation and the bandwidth overhead needed to code the field to practicable and useful values. Typically, up to 256 users can be accommodated by the use of an 8-bit CID field to provide an effective compromise between statistical multiplexing gain and bandwidth overhead and delay requirements. Because each circuit identifier relates uniquely to the minicells of the corresponding user, the length of the minicells associated with that user's service type will be known. The necessary information is stored in a look-up table SERV. For each minicell, the corresponding circuit identifier CID is input to the look-up table to recover either an explicit corresponding cell length or an interpretation of the information carried in the service specific control (SCF) field to derive an explicit determination of cell length so as to provide effective delineation. The service specific control field may indeed still be an explicit length in this manner for those services of frequently changing cell length. This obviates the need for a conventional length indicator (LI) field in redundant cases thus freeing additional bandwidth over the ATM connection. Changes in a user's minicell length may be readily accommodated by updating of the look-up table using an end-to-end signalling procedure that may change the stored information at any stage preferentially when establishing the interpretation at minicell circuit set-up, thus accommodating those users who require variable length cells.

In the arrangement described above, several VCs may be configured on the same link in order to increase the total number of users, the concatenation of small trunk groups being illustrated in FIG. 5. Traffic from two sets of N users (preferably 128 users) is fed to respective minicell buffers the outputs of which are multiplexed to an ATM cell buffer. A simulation model corresponding to this arrangement has been run for two services types with different packet sizes—CS-ACELP and PDC Half Rate. The two service types have mini-cell sizes including a two byte overhead, although any other overhead is equally applicable, of 12 and 22 octets respectively. CS-ACELP has a packet interval of 10 ms, and PDC-HR of 40 ms, so they are exemplar of the most of the service types intended for AAL-CU, and also the most exacting It can be shown that 128 users is an optimum size for the envisaged services that can achieve maximum AAL-CU connection bandwidth efficiency by tuning a maximum holding delay for cells assembled in the CPS and ATM layer, such that increasing the number of users in the connection gives no further benefit in increase of efficiency, and that increasing the size of the CPS overhead further to accommodate a larger CID field than 7 bits is self defeating in that the usable bandwidth will be reduced proportionally. In contrast, multiplexing several connections into a link may be used to exploit any available link bandwidth wherein a total of 64 users per connection is ensured, and wherein high performance is still obtained for a smaller number of users with practicable values of delay.

In a preferred embodiment, the vacated LI field may be employed to carry a minicell sequence number to provide a primary indication of minicell loss or mis-delivery where this has occurred. Mini-cell loss may be detected via secondary mechanisms, such as buffer over/underflow. But without a primary detection mechanism, lost mini-cells can not be distinguished from late mini-cells due to delay variation, which may give rise to an increased number of frame slips and more complex buffer management. A mini-cell sequence number is a straightforward primary mechanism to enable per circuit detection of loss. Due to payload error or to the random error probability of ATM cell loss, there is a high probability that at most an ATM cell's payload worth of mini-cells may be lost per event. Consequently, the number of bits required in the sequence number will be few in practice, and that is also dependent on the service application. A mini-cell sequence number of a few bits is a preferred field in the SSCS layer for many applications of phase sensitive service types, to prevent frame slip.

We measure the robustness of the mechanism by identifying the potential sources and likelihood of error that may occur in an AAL-CU connection. These errors can be categorised into three broad scenarios:

Mis-Connection

Due to an error event or ATM cell loss, a mini-cell protocol data unit is delivered to a user that comprises all or part of another user's data.

Frame Slip and Misdelivery

Due to mini-cell/ATM cell loss or error, at least one whole protocol data unit is not delivered to its user, which would cause a frame slip in a synchronous service. (An undetected mis-delivery—termed a frame stuff—would also affect end-to-end phase).

Loss of Mini-Cell Delineation

Due to ATM cell loss or error, the delineation of all mini-cells is lost.

Mis-Connection

It is a general principle of telecommunication systems that the probability of mis-connecting users should be very low. In AAL-CU, the potential mis-connection is generally of a short period rather than permanent. For this reason a specific measure is required to guard against mis-concatenation, due to minicells straddling an ATM cell, and mis-delivery, the two error scenarios that lead to mis-connection. Indeed for certain voice applications, generally those involving forward adaptation algorithms, no measure may need to be taken. A mis-connection leads to a short error burst that is typically no longer than the mis-connection duration. In contrast, for error intolerant services, such as wireline services, using backward adaptation algorithms, any cross-connection may lead to severe error extension over a period much greater than the cross-connection duration. For example, in ADPCM a single random/errored sample can lead to a noise burst in excess of 10 ms. This noise burst is characterised by a loud click that can be very uncomfortable to the listener, followed by a period of noise and distortion. LD-CELP is also similarly vulnerable. In the present arrangement, the common part mechanism of the AAL prevents mis-connection resulting from mis-concatenation or mis-delivery to a high probability following an error event.

Frame Slip

A mini-cell/ATM cell loss or error event may lead to the loss of a number of complete mini-cell payloads from a single mini-cell circuit. Such a loss would not only cause an error, but if undetected would also give rise to a permanent phase shift end-to-end for synchronous services. Adapting such services to an asynchronous delivery environment introduces this type of susceptibility. This leads to two basic requirements for the AAL-CU:

the general level of robustness should be such that the probability of mini-cell loss and error extension is minimised;

it should be possible to detect and communicate the loss of mini-cells.

Requirement 1 is clearly a common part function—any mechanism that fails to meet this objective will severely impair the performance of all service categories and several users.

Requirement 2 is however service category specific. Generally, for the error tolerant service category, the detection of the loss of voice data does not yield a significant performance advantage. However, for the error intolerant wire-line services, detection of the loss is important to prevent a permanent change in the end-to-end phase on the link. For example ADPCM or PCM carrying data modem traffic, any change of phase will cause loss of modem synchronisation and force a need to re-train which can take a significant time.

By detecting mini-cell loss, the established phase may then be maintained through sample interpolation, muting, or other straight-forward appropriate means. For mobile packet, where a long data packet may be segmented over several mini-cells, detecting lost data rather than a corrupted packet could be used for a more refined selective retransmission, and ensure higher throughput. A minicell sequence number can provide indication of which lost or corrupted segment should be retransmitted by suitable protocol of the SSCS or user layers in preference to retransmission of the entire packet.

Loss of Mini-Cell Delineation

If the information necessary to delineate the mini-cell structures within the ATM cell stream is contained within the mini-cells themselves, as a single mini-cell is lost, errored, or wrongly decoded through undetected error, a receiver will lose delineation of the mini-cell stream up to a deterministic re-synchronisation point.

In fact there are two distinct modes in which mini-cell delineation may be lost:

Undetected Loss of Delineation

Here the receiver loses delineation but erroneously continues to decode mini-cells. For this to happen, the errored mini-cell control information must be decoded such that it appears to be valid. If this occurs it will lead to mis-delivery of packets and generally, mis-connection of user's data.

Detected Loss of Delineation

Here the mini-cell boundary is lost but the receiver detects the loss and immediately begins to search for a re-synchronisation point. During this blanking period and error extension, mini-cells are discarded but there is no false delivery or mis-connection.

Generally loss of delineation leads to an error multiplication of the latent bit error ratio of the connection. Consider an example where a re-synchronisation point is available once in every 16 ATM cells. Under worse case conditions, a single bit error could lead to the elimination of nearly the whole 16 cell sequence—an error multiplication of up to 6000 times (16× 47×8), or more than three orders of magnitude. This will have a severe impact on all service categories, and would render many physical links unserviceable.

To address this problem, our arrangement maintains a minimal error extension to loss of mini-cell delineation as a common part function. This is of greater importance than an error correcting capability which, when mis-applied, can worsen the performance significantly.

Minicell Start Pointer

To achieve the required flexibility and bandwidth efficiency in the Multiplex/De-Multiplex (MAD) sub-layer mini-cells are allocated to straddle ATM payload boundaries. A preferred mechanism that can be used to provide a synchronisation point at which a receiver can reliably delineate the mini-cell boundaries is the Mini-cell Start Pointer (MSP). The MSP is a single octet field contained in the first byte of the ATM payload and points to the first mini-cell boundary in that payload. The MSP is preferentially located in every ATM cell payload, or periodically in every N cells. The bandwidth overhead of the MSP (as a function of the payload) is therefore:

$$\text{overhead} = \frac{1}{48\,n} \tag{1}$$

The functions that the MSP has been identified for are:

as a mechanism to enable the re-synchronisation of the mini-cell stream after delineation has been lost due to ATM cell loss or error. The periodicity of inclusion of the MSP defines the average error extension due to loss of delineation. If the average mini-cell length is L, then the average number of mini-cells lost due to loss of delineation is:

$$\text{Lostpackets} = \frac{48\,n}{2\,L} \tag{2}$$

as a mechanism to enable the detection of the loss of an ATM cell and thus prevent mis-concatenation.

From equation 2, it is clear that N should be made as small as possible, to minimise the effective multiplication of the inherent ATM cell loss probability in the link, especially when carrying mini-cells of few octets in length. This must be compromised against the overhead (EQ 1), although this concern is of secondary importance when one considers the larger overhead of the ATM and mini-cell headers.

The second function of the MSP, of preventing mis-concatenation, is shown to be far less effective. If the MSP is used as the sole mechanism for the prevention of mis-concatenation in the event of ATM cell loss, a mini-cell remainder may be the same over two successive ATM cells, and should the first ATM cell be lost, the tail of one mini-cell is concatenated onto the head of another—typically this will represent one user's data being passed to another.

For an ATM cell loss probability of $p_{cell\,loss}$, the probability of mis-concatenation is equal to this event not being detected (i.e all situations except that with an MSP in the cell and the remainder being wrong). For an MSP in every N cells and an average mini-cell length L:

$$p_{mis} = \left(1 - \frac{1}{n}\left(1 - \frac{1}{L}\right)\right) \times p \tag{3}$$

For large N, the MSP makes little contribution to preventing mis-concatenation. The goal is clearly to make N as small as possible, which is in-line with minimising the error extension above. For an MSP in every cell, i.e. N=1, equation 3 becomes:

$$p_{mis} = \frac{1}{L} \times p_{cell\,loss} \tag{4}$$

Since the length of mini-cells are designed to be much shorter than the ATM cell, and the average length L of a arbitrary or random service mix will be yet shorter, at best there can only be an order of magnitude improvement. In practice, restriction to few service types of very short length, or multiplexing may yield a systematic remainder such that a mis-concatenation will always occur following every ATM cell loss. Due to the probability of mis-concatenation being close, if not equal to the ATM cell loss probability, any proposal reliant solely on the MSP to prevent mis-concatenation is unlikely to meet the error performance requirements of many of AAL-CU's intended applications, particularly wireline services.

An MSP enables simple re-delineation of the mini-cell stream after a ATM cell loss or error; however its use alone is insufficient to prevent mis-concatenation.

ATM Cell Sequence Number

Advantageously, an ATM cell sequence number provides a primary mechanism for the detection of lost ATM cells; this is a fundamental requirement for preventing mis-concatenation. With a random ATM cell loss probability $p_{cell\ loss}$, a modulo-n sequence count requires n successive cells to be lost for the error to be undetectable, and thus the probability of mis-concatenation (without any other mechanism) becomes:

$$p_{mis} = p^n_{cell\ loss} \quad (5)$$

This obviously will be several orders of magnitude even for n=2, or 1 bit, a far superior yield to the improvement given by the MSP alone.

The ATM cell sequence count can also provides protection against burst cell losses, where the number of lost cells is considerably longer than the cycle of the sequence number. If one assumes a long-burst-rate probability $p_b$, the probability of mis-concatenation is:

$$P_{mis} = \frac{1}{n} \times p_b \quad (7)$$

The goal is clearly to make n large, but this is of questionable value as $p_b$ is very difficult to characterise, and is likely to be small compared to random cell loss.

An ATM cell sequence number is insufficient alone to enable re-delineation of the mini-cell sequence. As the mechanism provides no knowledge of the information lost, only an indication that something has been lost, it generally provides no information as to where the next mini-cell boundary will be. However, the use of an ATM cell sequence number provides a very economic mechanism to reduce the probability of mis-concatenation; even a single bit makes a sufficient impact. The ATM cell sequence number is fully complementary to the re-synchronisation capability of the MSP. A sequence number comprising a single bit is sufficient for most purposes as it is increasingly unlikely that more than one successive ATM cell will be lost from a cell stream as a result of the nature of the service carried and switching in the network

Protection of Common Part Fields

We now assesses the merits of error protection over the common part fields within the AAL-CU. There are two key objectives for providing error detection:
  to maximise coverage against erroneous behaviour of AAL-CU such that remedial action may be taken by, or indication may be given to the SSCS, to minimise the effect on a service application to which the SSCS has been tailored;
  and to minimise error extension that would elevate the latent bit error rate of the channel to an effective bit error rate that the targeted service categories could not intrinsically tolerate.

The first objective is essentially to mitigate the effect of a given error scenario by a strategy that is best suited to the particular service. If a service intrinsically can cope with the error scenarios of AAL-CU, then this may require no action by the SSCS, or a simple primitive across the SAP to invoke those recovery procedures of the service. At the other extreme, a susceptible service would require a more sophisticated SSCS that adopts an appropriate mitigation strategy.

The second objective implies that the error detection capability and the recovery strategy to normal behaviour must be sufficient to keep the error rate within acceptable bounds. In general, a recovery strategy of correlating several indications of expected behaviour, can be made far superior in performance than employing distinct and large error protection fields as a sole means of indicating correct behaviour. Obviously, a similar correlation means can be use to indicate errored behaviour. Furthermore, it is more beneficial to reduce the susceptibility of a protocol to error at the outset, mainly by using short fields, distribution, and implicit rather than explicit information, than to use a large contiguous control field.

Providing error correction capability is of dubious benefit as single bit error correction requires the characteristics of the channel and network to be very closely defined, as it relies on the probability of mis-correction being much smaller than that of true information recovery, i.e. a random bit error behaviour.

We define the probability of not detecting an error in the MSP and the PCI as pum and puc respectively. We also define the probability of simulation of the PCI, whether by error or by mis-delineation, to be:

$$p_{sim} = \frac{curr.users}{max.users} \cdot p_{uc} \quad (8)$$

Since the objective of AAL-CU is to have as many simultaneous users as possible:

$$p_{sim} \sim p_{uc} \quad (9)$$

We now consider the error scenarios in turn to measure the benefit of the detection mechanisms in providing an acceptable degree of confidence of correct operation in the shortest possible time.

Mis-Delineation

Correct delineation of mini-cells is the most important aspect of the AAL-CU; if wrongly delineated for whatever reason, to avoid a large error extension, the objective is to determine the situation as quickly as possible, and to verify the new found true position to a high degree of confidence, again as quickly as possible.

With no MSP, the probability of mis-delineation is:

$$p_{fd} = p_{sim}^\alpha \quad (10)$$

where α is the number of mini-cell headers required to make a decision within an acceptable confidence bound. Different values of a may be chosen for determining the loss or the acquisition of delineation, but clearly the greater $p_{sim}$ becomes, i.e. smaller amount of redundancy used, the greater α must be to meet the same criteria. Detecting loss of delineation due to error is relative to the latent BER of the channel, but its acquisition to a defined confidence bound is a fixed minimum. Consequently, a large amount of redundancy is be required to achieve delineation in a short time to a high degree of confidence, in a manner similar to the HEC of the ATM cell header. However, the mini-cell criterion is more demanding; unlike ATM cell headers which occur at a known correlation position by virtue of fixed length, in AAL-CU there is a recursive dependence of each successive mini-cell, and no correlation gain is obtained from the contents of the next mini-cell's PCI since in general they are unpredictable. With a CRC-5, $p_{sim}=3\times10^{-2}$, and four successive mini-cell headers ($\alpha=4$) would be required simply to achieve a confidence bound of acquisition of 1 in 106. This equates to a long minimum extension whenever an error occurs, and defines the limiting factor in performance for any method that does not use an MSP in every ATM cell.

Delineation by MSP

With an MSP, the probability of false acquisition, initially or following error, is:

$$p_{fa} = p_{um} \cdot p_e \cdot p_{sim}^{\alpha} \qquad (11)$$

which now depends on the latent BER $p_e$, as the probability that the MSP is undetectably in error. Consequently, there is many orders of magnitude gain for modest overhead. With a simple parity bit over the MSP and similarly the PCI, delineation can be achieved to a confidence bound in excess of the BER in a single step, i.e. $\alpha=1$. Thus an MSP with a simple parity bit is sufficient as a reliable delineation mechanism. Further increase in error detection redundancy does not make any significant performance gain, yet makes the protected fields more susceptible to error.

Mis-Delivery and Frame Slip

The probability of mis-delivery and any concomitant frame slip is directly proportional to the probability of PCI simulation, and inversely proportional to the predictability of the fields within the PCI and mini-cell payload. For the error-intolerant service category such as wire line services, the SSCS could provide additional safeguard against mis-delivery, such as a mini-cell sequence number, as well as mitigation of the effects.

It is preferred that there should be no requirement on the CPS error protection to address mis-delivery or frame-slip. Correction capability over the PCI is of questionable benefit, since the mis-delivery and error extension that will result yields an effective BER worse than the latent BER in a non-ideal channel, which could make the channel unserviceable.

Mis-Concatenation

The protection against mis-concatenation is an ATM cell sequence number that could be as short as a single bit. Without such a sequence number or MSP, the probability of mis-concatenation is:

$$p_{mis} = \left(1 - \left(1 - \frac{1}{L}\right)\cdot(1-psim)\right) \times p_{cell\,loss} \qquad (12)$$

One can assess the contribution of the error protection of the PCI by considering two extremes. With full redundancy, or with no protection, the diffreence in performance is dependent only on the distribution of average minicell length L. At best this can achieve an order of magnitude gain over the latent ATM cell loss probability p.

With an MSP and ATM sequence count, the probability of mis-cocatenation is:

$$p_{mis} = \left(\frac{1}{L_{max}} + \left(1 - \frac{1}{L_{max}}\right)\cdot p_{sim}\right)\cdot \frac{1}{n}\cdot p_{um}\cdot p_e \cdot p_{cellloss} + \frac{1}{L}\cdot p_{cellloss}$$

$$p_{mis} \approx p_e \cdot p_{cellloss} + p_{cellloss}$$

Thus the error protection capability of either the PCI or the MSP has insignificant effect in the performance of mis-concatenation when an ATM sequence count is used.

A suitable minicell start pointer (MSP) field which we term a multiplex/demultiplex (MAD) field contains the offset of the next mini-cell header, but also includes a one bit ATM cell sequence count and single bit parity. The MAD field is included in every cell, as this gives the shortest error extension on loss of delineation for the lowest overhead.

The single bit sequence count could of course be accommodated by the AUU bit in the ATM header, but with the bit in the MAD field, the AAL-CU proposal is independent of the ATM layer. The single bit parity is sufficient to detect error in this field, since both the offset and the sequence count are fully predictable by a receiver; the parity differentiates an errored field from a lost ATM cell.

We additionally propose that services sensitive to mis-delivery employ a short mini-cell sequence number at the start of the SSCS SDU, and any requisite error detection capability at the end of the SDU or elsewhere in the SSCS SDU.

The invention claimed is:

1. An ATM traffic assembly apparatus for assembling traffic from a plurality of users for transmission over an ATM connection, said assembly apparatus comprising:
    a mini-cell assembler for assembling the plurality of users' traffic into respective mini-cells;
    a look-up table for storing information pertaining to a mini-cell length associated with a user's mini-cells for each of said plurality of users' traffic, wherein the mini-cell length is determinable according to a service type classification of the user; and
    a multiplexer for multiplexing the mini-cells into ATM cells.

2. The apparatus as claimed in claim 1, wherein the look-up table storing the information pertaining to the mini-cell length associated with the user's mini-cells derives an explicit mini-cell length indicator for that user's mini-cells from a connection identifier for that user's mini-cells.

3. The apparatus as claimed in claim 1, wherein the look-up table storing the information pertaining to the mini-cell length associated with the user's mini-cells derives an implicit mini-cell length indicator by interpreting information contained in a service specific control (SCF) field for that user's mini-cells.

4. The apparatus as claimed in claim 1, wherein the look-up table is arranged to store the information pertaining to the mini-cell lengths for the plurality of users' traffic at an interface of an ATM network hosting the ATM connection.

5. The apparatus as claimed in claim 4, wherein the look-up table is arranged to store the information pertaining to the mini-cell length associated with the user's mini-cells at an entry associated with that user in the look-up table.

6. The apparatus as claimed in claim 5, wherein the look-up table is arranged to store a connection identifier for that user's mini-cells at the entry associated with that user in the look-up table.

7. The apparatus as claimed in claim 4, wherein the look-up table is arranged to store information contained in a service specific control (SCF) field for that user's mini-cells at the entry associated with that user in the look-up table.

8. The apparatus as claimed in claim 1, wherein the ATM connection comprises a virtual connection (VC).

9. The apparatus as claimed in claim 8, wherein a plurality of VCs are configured on the ATM connection.

10. The apparatus as claimed in claim 1, wherein the look-up table is arranged to derive the information pertaining to the mini-cell length associated with the user's mini-cells as a correspondence between a connection identifier and a mini-cell length indicator for that user.

11. The apparatus as claimed in claim 10, wherein said look-up table derives said correspondence from information to be transmitted in a service specific control (SCF) field of that user's mini-cells.

12. The apparatus as claimed in claim 1, wherein it is arranged to provide a sequence number for a mini-cell.

13. The apparatus as claimed in claim 12, wherein it is arranged to encapsulate said mini-cell sequence number in a mini-cell start pointer.

14. The apparatus as claimed in claim 13, wherein it is arranged to provide the mini-cell start pointer in every ATM cell containing mini-cells.

15. The apparatus as claimed in claim 1, wherein it provides a sequence number for each ATM cell containing mini-cells.

16. The apparatus as claimed in claim 15, wherein it provides a mini-cell start pointer in every ATM cell containing mini-cells and the ATM cell sequence number is included in the mini-cell start pointer.

17. The apparatus as claimed in claim 15, wherein the ATM cell sequence number is included in an ATM-user-to-ATM-user (AUU) bit of a header of an ATM cell.

18. The apparatus as claimed in claim 15, wherein the ATM cell sequence number is defined by a single bit.

19. The apparatus as claimed in claim 1, wherein it allocates at least one of said users a variable length mini-cells and wherein it updates the stored information pertaining to a mini-cell length associated with that user's mini-cells.

\* \* \* \* \*

UNITED STATES PATENT AND TRADEMARK OFFICE
CERTIFICATE OF CORRECTION

PATENT NO. : 8,249,075 B2  
APPLICATION NO. : 12/268243  
DATED : August 21, 2012  
INVENTOR(S) : Brueckheimer et al.

It is certified that error appears in the above-identified patent and that said Letters Patent is hereby corrected as shown below:

In the Specifications:

In Column 4, Line 27, delete "octets" and insert -- octets; --, therefor.

In Column 6, Line 65, delete "data modern" and insert -- data modem --, therefor.

In Column 6, Line 66, delete "modern" and insert -- modem --, therefor.

Signed and Sealed this  
Thirteenth Day of August, 2013

Teresa Stanek Rea  
*Acting Director of the United States Patent and Trademark Office*